United States Patent [19]

Teller et al.

[11] 3,879,385
[45] Apr. 22, 1975

[54] 3-(ALPHA-TRIFLUOROMETHYLARYLACETAMIDO)-1,4-CYCLO(1,-CARBOXYL)ALKYLENETHIO)-AZETIDIN-2-ONE DERIVATIVES

[75] Inventors: Daniel M. Teller, Devon; John H. Sellstedt; Charles J. Guinosso, both of King of Prussia, all of Pa.

[73] Assignee: American Home Products Corporation, New York, N.Y.

[22] Filed: May 16, 1973

[21] Appl. No.: 360,857

[52] U.S. Cl............ 260/243 C; 424/246; 260/239.1; 424/271
[51] Int. Cl...................... C07d 99/24; C07d 99/16
[58] Field of Search ................................ 260/243 C

[56] References Cited
UNITED STATES PATENTS
3,641,021  2/1972  Ryan............................... 260/243 C Primary Examiner—Nicholas S. Rizzo
Attorney, Agent, or Firm—Richard K. Jackson

[57] ABSTRACT 3-($\alpha$-Trifluoromethylarylacetamido)-1,4-[cyclo-(1'-carboxy)alkylenethio]azetidin-2-one derivatives possessing antibacterial activity are produced by the reaction of 3,3,3-trifluoro-2-phenylpropanoic acid or 3,3,3-trifluoro-2-p-hydroxyphenylpropanoic acid and a 3-amino-1,4-[cyclo(1'-carboxy)alkylenethio]-azetidin-2-one derivative in the presence of a condensing agent or by conversion of the propanoic acid derivative to an acid halide.

3 Claims, No Drawings

3-(ALPHA-TRIFLUOROMETHYLARYLACETAMIDO)-1,4-CYCLO(1,-CARBOXYL)ALKYLENETHIO)-AZETIDIN-2-ONE DERIVATIVES

BACKGROUND OF THE INVENTION

Acylated 7-aminocephalosporanic acid derivatives containing a chloroalkyl group in 2-position of the moiety are disclosed by Kujoshi Hattori in Japanese Pat. No. 29,258/69 (Derwent Report No. 41452).

DESCRIPTION OF THE INVENTION

In accordance with this invention there is provided a group of azetidin-2-one derivatives which are active antibacterials. More specifically, the compounds of this invention may be generically termed 3-[α-trifluoromethylphenyl and p-hydroxyphenyl)acetamido]-1,4-[cyclo(1'-carboxyl)alkylenethiol]-azetidin-2-one derivatives which present the structural formula:

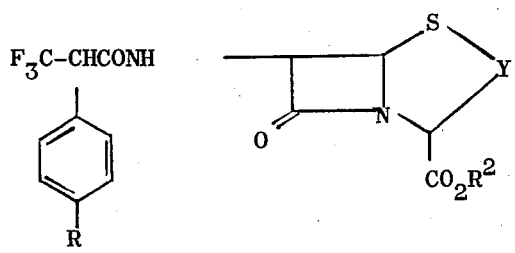

wherein
R is a member selected from the group consisting of —H and —OH,
$R^2$ is a member selected from the group consisting of —H and an alkali metal cation, and
Y is a member selected from the group consisting of

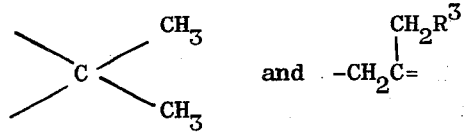

in which $R_3$ is —H, (lower)alkanoyloxy,

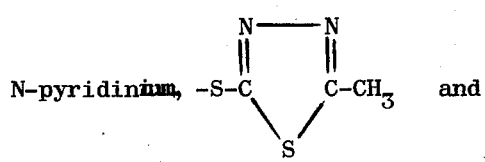

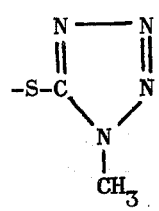

The expression 1,4-[cyclo(1'-carboxy)alkylenethio, used in the generic name for the compounds of this invention, is intended to embrace the 1-carboxy bridge member

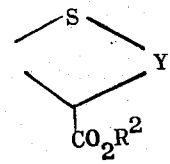

as it appears in the preceding paragraph. The term (lower)alkanoyloxy is used to embrace the lower fatty acyloxy moieties such as acetoxy, propanoyloxy, butanoyloxy, amyloxy, hexanoyloxy, and the like.

The 3-(α-trifluoromethylphenylacetamido)azetidinone derivatives of this invention are prepared by the reaction of 3,3,3-trifluoro-2-phenylpropanoic acid or 3,3,3-trifluoro-2-p-hydroxyphenylpropanoic acid with a 3-amino azetidinone derivative designated $H_2NR^1$ in the presence of a condensing agent according to the equation

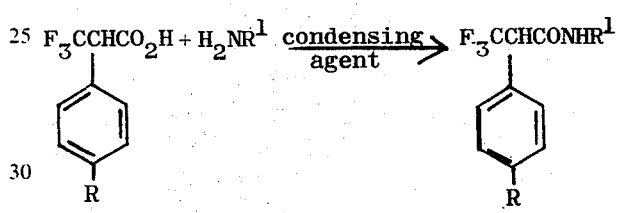

in which R is —H or —OH and the condensing agent is such as carbonyldiimidazole, dicyclohexylcarbodiimide, dicyclohexylcarbodiimide in the presence of N-hydroxysuccinimide or 1-hydroxybenzotriazole, isobutylchloroformate, and the like. These and similar condensing agents which are operable in the preparation of the antibacterial agents of this invention are presented in Spencer et. al., J. Med. Chem. 15, pp 333–335 (1972); Klausner et.al., Synthesis, pp 453–463 (1972) and U.S. Pat. No. 3,338,896.

Alternatively, the α-trifluoromethylarylacetic acid precursor may be converted by known methods to an acid halide which is then used in aqueous medium to acylate the free amino group of either a tertiary amine salt or an alkali metal salt of the 3-amino azetidinone derivative. In addition, the α-trifluoromethylarylacetic acid halide precursor may be used to react in organic solution with either a tertiary amine salt or a silylated, phosphorylated or saccharinated derivative of the 3-aminoazetidinone reactant. In each case, the protecting groups are readily removed by hydrolysis at the conclusion of the reaction.

The 3,3,3-trifluoro-2-phenyl (and p-hydroxyphenyl)propanoic acid reactants are prepared by the technique of Aaron et.al., J. Org. Chem., 32, pp. 2797–2803 (1967).

The compounds of this invention are antibacterial agents effective against gram-positive and gram-negative test organisms as well as penicillin resistant staphylococcus at an inhibitory concentration at or below 250 micrograms per milliliter using the well known and scientifically accepted agar serial dilution technique. Thus, the compounds of this invention are useful in the fields of comparative pharmacology and microbiology and may be used as growth promoters in animals and for the treatment of infections amenable to treatment with penicillins and cephalosporins.

The following examples are presented for purposes of illustrating the invention and are not to be construed as limitations upon the true scope of the contribution. The biological activity data presented at the conclusion of each example illustrate the compounds activity against specific bacteria of the designated strain in terms of the minimum inhibitory concentration of the compound in micrograms per milliliter to completely inhibit the test organism. The abbreviations for each bacteria are

```
ST AU — Staphylococcus aureus
BA SU — Bacillus subtilis
NE CA — Neisseria catarrhalis
HE SP — Herellea species
ES CO — Escherichia coli
PR VU — Proteus vulgaris
SA PA — Salmonella paratyphi
BO BR — Bordetella brochiseptica
EN AE — Enterobacter aerogenes
ES IN — Escherichia intermedia
KL PN — Klebsiella pneumoniae
```

In the working examples, the expression ACA refers to aminocephalosporanic acid, ADCA refers to aminodesacetoxy-cephalosporanic acid, acid, and APA refers to aminopenicillanic acid.

EXAMPLE 1

7-(3,3,3-Trifluoro-2-phenylpropionamido)cephalosporanic acid.

To a solution of 3,3,3-trifluoro-2-phenylpropanoic acid (0.51 g, 0.0025 moles) in dry dimethylformamide (3.0 ml) at room temperature is added carbonyl diimidazole (0.41 g, 0.0025 moles) under nitrogen. Carbon dioxide evolution begins immediately. After 30 minutes at room temperature, the residual carbon dioxide is removed under vacuum. The mixture is cooled to −10°C. and a solution of 7-ACA (0.68 g, 0.00095 moles) in dry methylene chloride (10 ml.) containing triethyl amine (1.04 ml.) is added all at once. After stirring 2 hours at room temperature, the mixture was concentrated at below 40°C. n-Butanol (2.5 ml.) is added, then potassium ethyl hexanoate (1.25 ml. of 2M solution in n-butanol). After stirring 10 minutes, diethyl ether (100 ml.) is added, the product filtered and dried in vacuo at room temperature to yield a tan solid, mp. 150°–200°C. (decomp.); $\lambda_{max}^{KBr}$ 5.52, 5.73, 6.20 $\mu$; NMR has 1.87 and 2.02 ppm methyl peaks.

| BA SU | 6633 | .488 |
| ST AU | 6538P | .976 |
| ST AU | SMITH | 1.95 |
| ST AU | 53–180 | 3.90 |
| ST AU | CHP | 7.81 |
| KL PN | 10031 | 15.6 |
| SA PA | 11737 | 31.3 |
| NE CA | 8193 | 62.5 |
| BO BR | 4617 | 125 |
| EN AE | 13048 | 125 |
| ES CO | 9637 | 125 |
| HE SP | 9955 | 125 |
| PR VU | 6896 | 125 |
| ES IN | 65–1 | 250 |

EXAMPLE 2

3-Methyl-8-oxo-7-(3,3,3-trifluoro-2-phenylpropionamido)-5-thia-1-azabicyclo[4.2.0]-oct-2-ene-2-carboxylic acid.

Using the procedure described in Example 1 but substituting 7-ADCA (0.53 g, 0.0025 moles) for 7-ACA and diazabicyclononane (0.31 g) for triethyl amine gives the title compound, mp. 130°–138°C. (decomp.); $\lambda_{max}^{KBr}$ 5.53, 5.68, 5.96 $\mu$, NMR has 1.88 ppm and 2.55 ppm peaks.

| BA SU | 6633 | 7.81 |
| ST AU | 6538P | 15.6 |
| ST AU | SMITH | 15.6 |
| ST AU | 53–180 | 62.5 |
| ST AU | CHP | 125 |
| KL PN | 10031 | 250 |

EXAMPLE 3

6-(3,3,3-Trifluoro-2-phenylpropionamido)penicillanic acid.

Using the procedure described in Example 1 but substituting 6-APA (0.54 g, 0.0025 moles) for 7-ACA gives the title compound, mp. 145°–160°C. (decomp.); $\lambda_{max}^{KBr}$ 5.54, 6.20 (shoulder), 6.40-6.95 $\mu$; NMR has 1.48 ppm and 1.52 ppm peaks.

| ST AU | 6538P | .976 |
| ST AU | SMITH | 1.95 |
| BA SU | 6633 | 15.6 |
| NE CA | 8193 | 15.6 |
| HE SP | 9955 | 31.3 |
| ES CO | 9637 | 125 |
| PR VU | 6896 | 125 |
| SA PA | 11737 | 125 |
| ST AU | CHP | 125 |
| ST AU | 53–180 | 125 |
| BO BR | 4617 | 250 |
| EN AE | 13048 | 250 |
| ES IN | 65–1 | 250 |
| KL PN | 10031 | 250 |

What is claimed is:

1. A compound of the formula:

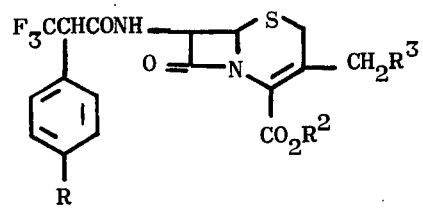

in which

R is —H or —OH;

$R^2$ is —H or an alkali metal cation; and $R^3$ is —H, (lower)alkanoyloxy or N-pyridinium.

2. The compound of claim 1 which is 7-(3,3,3-trifluoro-2-phenylpropionamido)cephalosporanic acid and the alkali metal salts thereof.

3. The compound of claim 1 which is 3-methyl-8-oxo-7-(3,3,3-trifluoro-2-phenylpropionamido)-5-thia-1-azabicyclo-[4.2.0]-oct-2-ene-2-carboxylic acid and the alkali metal salts thereof.

* * * * *